United States Patent Office 3,409,670
Patented Nov. 5, 1968

3,409,670
ACYLATION OF AROMATIC AMINES
Earl A. Nielsen, Lombard, Ill., assignor to Universal Oil Products Company, Des Plaines, Ill., a corporation of Delaware
No Drawing. Filed Feb. 28, 1966, Ser. No. 530,358
8 Claims. (Cl. 260—562)

ABSTRACT OF THE DISCLOSURE

Acylation of substituted aromatic amines in presence of hydriodic and hypophosphorous acids and certain salts thereof as color suppressants.

---

This invention relates to a process for the acylation of aromatic amines. More particularly, the invention is concerned with an improved process for the acylation of substituted aromatic amines whereby an improved product is obtained.

The acylation of aromatic amines is usually effected by treating an aromatic amine with an acylating agent at an elevated temperature. However, the product which is obtained thereby is usually discolored due to the presence of impurities in the final product. These impurities are usually formed by an oxidation of certain compounds present during the reaction. When the resultant acylated aromatic amine is to be used for certain specific purposes such as a pharmaceutical product or as a component in a dye, the discoloration presents certain commercial disadvantages inasmuch as the color must be removed by relatively expensive purification treatments, said treatments involving the use of solvents and/or discolorizing materials. A specific example of this is the use of acetyl-p-aminophenol in pharmaceutical products. The aforementioned compound is especially useful as a component in preparing pain relieving drugs. For example, acetyl-p-aminophenol which possesses relatively long term analgesic properties and which has no side effects may be compounded with aspirin (acetylsalicylic acid) which possesses relatively short term analgesic properties. Therefore, it is possible to substitute the aforementioned acetyl-p-aminophenol in place of phenacetin which has preferably been used in certain commercial pain relieving compounds but which has been found to possess certain properties which result in deleterious side effects if said compounds are used for a long period of time.

Heretofore, the acylation of aromatic amines has been effected utilizing certain compounds which will reduce the color of the desired product, said compounds comprising salts of inorganic sulfur acids, especially those oxygen acids of sulfur which are in a lower state than that of sulfuric acid. However, when acylating aromatic amines which contain substituents on the aromatic ring other than the amine radical, it has been found that the tendencies to form colored impurities is greater. This is especially true when a hydroxyl group is present as a substituent on the aromatic ring, said hydroxyl group rendering the amino aryl compound more sensitive to color forming oxidation reactions than is the case with an aryl compound which contains only an amine substituent.

It is therefore an object of this invention to provide a process for obtaining acylated aromatic amines which do not contain colored impurities.

Another object of this invention is to provide a process for producing acetyl aromatic amines which contain substituents on the ring other than the amine substituent.

In a broad aspect, an embodiment of this invention resides in a process for the acylation of a substituted aromatic amine which comprises treating said substituted aromatic amine with an acylation agent in the presence of a color suppressant compound selected from the group consisting of hydriodic acid, hypophosphorous acid and salts thereof at acylation conditions, and recovering the resultant acylated substituted aromatic amine.

A specific embodiment of this invention resides in a process for the acylation of p-aminophenol which comprises treating said p-aminophenol with acetic acid at a temperature in the range of from about 0° to about 150° C. in the presence of a color suppressant compound comprising sodium hypophosphite and recovering the resultant acetyl-p-aminophenol.

Other objects and embodiments will be found in the following further detailed description of this invention.

As hereinbefore set forth, the present invention is concerned with an improvement in the process for the acylation of aromatic amines whereby the resultant acyl aromatic amines are substantially free from color contaminants. The process is effected by treating an aromatic amine and particularly a substituted aromatic amine with an acylating agent in the presence of a color suppressant compound. Acylating agents which may be utilized in the process of this invention include acetic acid, acetic anhydride, acetyl chloride, acetyl bromide, acetyl iodide, propionic acid, propionic anhydride, propionyl chloride, propionyl bromide, butyric acid, butyric anhydride, butyryl chloride, butyryl bromide, valeric acid, valeric anhydride, valeryl chloride, valeryl bromide, caproic acid, caproic anhydride, caproyl chloride, caproyl bromide, etc. It is to be understood that the aforementioned acylating agents are only representative of the class of compounds which may be used and that the present invention is not necessarily limited thereto.

Examples of aromatic amines and particularly aromatic amines which contain other substituents on the aromatic ring which may be acylated include p-aminophenol, o-aminophenol, m-aminophenol, o-nitroaniline, n-nitroaniline, p-nitroaniline, 4-aminopyrocatechin, 2-aminoresorcinol, 5-aminoresorcinol, 2-aminohydroquinone, etc. Examples of color suppressant compounds which may be used to reduce or retard the color forming oxidation reactions which may occur simultaneously include hydriodic acid, hypophosphorous acid, and the alkali metal salts thereof such as sodium iodide, potassium iodide, lithium iodide, sodium hypophosphite, potassium hypophosphite, lithium hypophosphite, etc. In addition, it has also been found that mixtures of these compounds may also be used as color suppressants, such mixtures including sodium iodide-sodium hypophosphite, potassium iodide-potassium hypophosphite, etc. It is also contemplated within the scope of this invention that the alkaline earth metal salts of hydriodic acid and a hypophosphorous acid as well as ammonium salts thereof may also be used, although not necessarily with equivalent results.

The process of the present invention is effected at a temperature ranging from about 0° up to about 150° C. or more. If so desired, the reaction may be effected in the presence of a substantially inert organic solvent or diluent including aromatic hydrocarbons such as benzene, toluene, o-xylene, m-xylene, p-xylene, ethylbenzene, etc.; paraffinic hydrocarbons such as n-pentane, n-hexane, n-heptane, etc.; cycloparaffinic hydrocarbons such as cyclopentane, methylcyclopentane, cyclohexane, etc.

The process of this invention may be effected in any suitable manner and may comprise either a batch or continuous type operation. When a batch type operation is used, a quanitty of the substituted aromatic amine is placed in an appropriate apparatus along with a relatively small amount of the color suppressant compound, said compound being present in an amount ranging from about 0.01 to about 5 mole percent of the total reactants. Following this, the acylating agent is added and, if so desired, the organic solvent. The apparatus is then heated or cooled to the desired reaction temperature and maintained thereat for a predetermined residence time. At the end of this time, the apparatus is allowed to return to room temperature and the desired product is recovered by conventional means such as, for example, fractional distillation, crystallization, etc.

It is also contemplated within the scope of this invention that the process described herein may be effected in a continuous manner of operation. When such an operation is used, the aromatic amine and acylating agent are continuously charged to a reaction vessel containing the color suppressant compound, said vessel being maintained at the proper operating conditions of temperature and pressure. Alternative methods of charging the reactants is to combine one or both with an inert organic solvent and charging the resultant mixture to the reaction vessel, or, if so desired the reactants may be admixed prior to entry into said vessel and charged thereto in a single stream. In addition, the color suppressant compound which is to be used may be dissolved in either the acylating agent or the amine for a more convenient mode of operation. The reactor effluent is continuously withdrawn from the vessel after which the desired product comprising an acylated aromatic amine is separated from any unreacted starting material and recovered, the latter being recycled to form a portion of the feed stock.

The following examples are given to illustrate the process of the present invention which, however, are not intended to limit the generally broad scope of the present invention in strict accordance therewith.

EXAMPLE I

In this example, 44 g. (0.4 mole) of p-aminophenol, 180 g. (3.0 mole) of acetic acid and 1.5 g. (0.01 mole) of sodium iodide were placed in the glass liner of a rotating autoclave. The autoclave was heated to a temperature of about 90° C., and maintained thereat for a period of about 6 hours. At the end of this time, the excess acetic acid was stripped off under vacuum and the reaction product recovered. The residue was recrystallized from water and the desired crystals which were nearly colorless, comprising the desired acetyl p-aminophenol, were recovered.

EXAMPLE II

In this example 44 g. (0.4 mole) of p-aminophenol, 180 g. (3.0 mole) of acetic acid along with 1.5 g. (0.1 mole) of sodium iodide and 0.9 g. (0.01 mole) of sodium hypophosphite are placed in the glass liner of a rotating autoclave. The autoclave is sealed and heated to a temperature of about 90° C. After maintaining the autoclave at this temperature for a period of about 1 hour, the autoclave and contents thereof are allowed to cool to room temperature. The excess acetic acid is removed under vacuum and the reaction product is recovered. Recrystallization from water will result in obtaining nearly colorless crystals of acetyl p-aminophenol.

EXAMPLE III

In this example, 21.8 g. (0.2 mole) of p-aminophenol, 62 g. (1.0 mole) of acetic acid and 1.7 g. (0.01 mole) of potassium iodide are placed in an alkylation flask. The flask is heated to a temperature of about 120° C. and maintained thereat for a period of about 2.5 hours. At the end of this time, the flask and contents thereof are allowed to cool to room temperature. The excess acetic acid is removed by filtration and the precipitate is recrystallized from water. There is obtained nearly colorless crystals of acetyl p-aminophenol.

EXAMPLE IV

A mixture of 21.8 g. (0.2 mole) of p-aminophenol, 74 g. (1.0 mole) of propionic acid and 1.7 g. (0.01 mole) of potassium iodide is placed in an alkylation flask. The flask is heated to a temperature of about 120° C. and maintained thereat for a period of about 2.5 hours. At the end of this time, the flask and contents thereof are allowed to cool to room temperature, following which the excess propionic acid is removed by filtration and the precipitate is recrystallized from water. There is obtained nearly colorless crystals of propionyl p-aminophenol.

EXAMPLE V

A mixture of 44 g. (0.4 mole) of p-aminophenol, 184 g. (2.0 mole) of acetyl chloride, 1.5 g. (0.1 mole) of sodium iodide and 0.9 g. (0.01 mole) of sodium hypophosphite is placed in the glass liner of a rotating autoclave. The autoclave is sealed and heated to a temperature of about 90° C. for a period of about 1 hour. At the end of this time, the autoclave and contents thereof are allowed to cool to room temperature, the excess acetic acid is removed under vacuum and the reaction product is recovered. The reaction product is recrystallized from water and nearly colorless crystals of acetyl p-aminophenol are recovered.

I claim as my invention:

1. An acylation process which comprises reacting an aromatic amine selected from the group consisting of aminophenol, nitroaniline, aminopyrocatechin, aminoresorcinol and aminohydroquinone at an acylating temperature of from about 0° to about 150° C. with an acylating agent selected from the group consisting of acetic acid, acetic anhydride, acetyl chloride, acetyl bromide, acetyl iodide, propionic acid, propionic anhydride, propionyl chloride, propionyl bromide, butyric acid, butyric anhydride, butyryl chloride, butyryl bromide, valeric acid, valeric anhydride, valeryl chloride, valeryl bromide, caproic acid, caproic anhydride, caproyl chloride and caproyl bromide in the presence of from about 0.01 to about 5 mole percent of the reactants of a color suppressant compound selected from the group consisting of hydriodic acid, hypophosphorous acid and alkali metal, alkaline earth metal and ammonium iodide and hypophosphite.

2. The process as set forth in claim 1, further characterized in that said color suppressant compound comprises hydriodic acid.

3. The process as set forth in claim 1, further characterized in that said color suppressant compound comprises sodium iodide.

4. The process as set forth in claim 1, further characterized in that said color suppressant compound comprises sodium hypophosphite.

5. The process as set forth in claim 1, further characterized in that said color suppressant compound comprises potassium hypophosphite.

6. The process as set forth in claim 1, further characterized in that said acylation agent comprises acetic acid.

7. The process as set forth in claim 1, further characterized in that said acylation agent comprises acetyl chloride.

8. The process as set forth in claim 1, further characterized in that said aromatic amine comprises p-aminophenol and said acylating agent comprises acetic acid.

No references cited.

HENRY R. JILES, *Primary Examiner.*

H. I. MOATZ, *Assistant Examiner.*